US012352583B2

(12) United States Patent
Shao et al.

(10) Patent No.: US 12,352,583 B2
(45) Date of Patent: Jul. 8, 2025

(54) METHOD AND INTERNET OF THINGS SYSTEM FOR SAFETY INSPECTION BASED ON SMART GAS GEOGRAPHIC INFORMATION SYSTEM

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/677,810

(22) Filed: May 29, 2024

(65) Prior Publication Data
US 2024/0318965 A1    Sep. 26, 2024

Related U.S. Application Data

(63) Continuation of application No. 18/357,226, filed on Jul. 24, 2023, now Pat. No. 12,031,830.

(30) Foreign Application Priority Data

Jun. 26, 2023 (CN) .......................... 202310752703.9

(51) Int. Cl.
G01C 21/34 (2006.01)
G16Y 10/35 (2020.01)
G16Y 40/50 (2020.01)

(52) U.S. Cl.
CPC .......... *G01C 21/3407* (2013.01); *G16Y 10/35* (2020.01); *G16Y 40/50* (2020.01)

(58) Field of Classification Search
CPC .... G01C 21/3407; G16Y 10/35; G16Y 40/50; G16Y 40/35; G16Y 40/10; G16Y 40/20;
(Continued)

(56) References Cited

U.S. PATENT DOCUMENTS 9,041,794 B1     5/2015  Olsson et al.
11,525,819 B1   12/2022  Macmullin et al.
(Continued)

FOREIGN PATENT DOCUMENTS

CN      107563356 A      1/2018
CN      107808133 A      3/2018
(Continued)

OTHER PUBLICATIONS

Li, Kai, Analysis of the Application Prospect of UAVs in Oil and Gas Pipeline Inspection Management, Science & Technology Information, 8: 126-129, 2023.

*Primary Examiner* — Navid Z. Mehdizadeh
*Assistant Examiner* — Caitlin R McCleary
(74) *Attorney, Agent, or Firm* — Metis IP LLC

(57) ABSTRACT

Method and Internet of Things system for safety inspection based on a smart gas geographic information system (GIS) are provided. The method comprises: determining a gridding result through performing gridding processing on a gas pipeline network; determining a required inspection area and an optional inspection area based on the gridding result; generating a target inspection route based on the required inspection area and the optional inspection area; determining an inspection plan based on the target inspection route; generating an inspection instruction based on the inspection plan; updating a gas pipeline grid graph based on inspection data after inspecting each inspection area; determining at least one failure possibility of the at least one node or the at least one edge through a failure possibility determination (Continued)

model; determining a grid safety score based on the at least one failure possibility, and determining an updated inspection plan based on the grid safety score.

19 Claims, 5 Drawing Sheets

(58) Field of Classification Search
CPC .......... Y02P 90/30; Y04S 10/50; H04L 67/12; H04L 67/52; G07C 1/20; H04Q 9/00; H04Q 2209/60; H04Q 2209/70; H04Q 2209/80; G06Q 50/06; G06Q 10/20; G06Q 10/04; G06Q 10/06311; G06Q 10/063; G06Q 10/06; F17D 5/005; F17D 5/02; F17D 3/01
See application file for complete search history.

(56) References Cited

U.S. PATENT DOCUMENTS

| | | |
|---|---|---|
| 2015/0127302 A1* | 5/2015 | Johnson ................ G06F 30/394 703/1 |
| 2017/0308796 A1 | 10/2017 | Heng et al. |
| 2018/0129193 A1 | 5/2018 | Gotou et al. |
| 2018/0332370 A1 | 11/2018 | Shao |
| 2021/0247369 A1 | 8/2021 | Nottrott et al. |
| 2022/0107189 A1 | 4/2022 | Leen et al. |

FOREIGN PATENT DOCUMENTS

| | | |
|---|---|---|
| CN | 110415220 A | 11/2019 |
| CN | 113888126 A | 1/2022 |
| CN | 115907264 U | 4/2023 |
| CN | 116011740 A | 4/2023 |
| CN | 116308965 A | 6/2023 |
| KR | 20220075245 A | 6/2022 |

* cited by examiner

METHOD AND INTERNET OF THINGS SYSTEM FOR SAFETY INSPECTION BASED ON SMART GAS GEOGRAPHIC INFORMATION SYSTEM

CROSS-REFERENCE TO RELATED APPLICATION

This application is a continuation of U.S. patent application Ser. No. 18/357,226, filed on Jul. 24, 2023, which claims priority to Chinese Patent Application No. 202310752703.9, filed on Jun. 26, 2023, the entire contents of which are hereby incorporated herein by reference.

TECHNICAL FIELD

The present disclosure relates to the technical field of the Internet of Things, and in particular, to method and Internet of Things system for safety inspection based on smart gas geographic information system (GIS).

BACKGROUND

With the improvement of urbanization, the demand for gas is constantly increasing, and higher requirements are put forward for the supply capacity of gas. In order to ensure the safe operation of a gas pipeline network, it is necessary to perform regular inspections on the gas pipeline network. Due to differences in geographical features and pipeline features of different gas pipeline networks, there are differences in the inspection priority and inspection frequency. A conventional and indiscriminate inspection manner is adopted, which wastes manpower and financial resources and has low inspection efficiency.

Therefore, it is necessary to provide method and Internet of Things system for safety inspection based on smart gas geographic information system (GIS) to perform grading inspections on the gas pipeline network, which improves the inspection efficiency and inspection quality of the gas pipeline network.

SUMMARY

One or more embodiments of the present disclosure provide a method for safety inspection based on a smart gas geographic information system (GIS). The method is implemented by an Internet of Things system for safety inspection based on the smart gas GIS. The Internet of Things system includes a smart gas user platform, a smart gas service platform, a smart gas pipeline network safety management platform, a smart gas pipeline network device sensing network platform, and a smart gas pipeline network device object platform, the smart gas user platform includes a terminal device, the smart gas service platform includes a first server, the smart gas pipeline network safety management platform includes a second server, the smart gas pipeline network device sensing network platform includes a communication network and a gateway, and the smart gas pipeline network device object platform includes various types of gas pipeline network devices and monitoring devices. The method comprises: determining a gridding result through performing gridding processing on a gas pipeline network by a gridding algorithm based on a preset period, wherein the gridding result refers to each of a plurality of divided grid areas after the gridding processing and evaluation result corresponding to each of the plurality of divided grid areas; determining a required inspection area and an optional inspection area based on the gridding result, wherein the required inspection area refers to an area with frequent failures in a short term, and the optional inspection area refers to an area that has just been inspected in the short term and has no failures; generating a target inspection route based on the required inspection area and the optional inspection area; determining an inspection plan based on the target inspection route, wherein the inspection plan includes an inspection time, an inspection route, the required inspection area, and the optional inspection area; generating an inspection instruction through a preset generation algorithm based on the inspection plan, uploading the inspection instruction to the smart gas service platform through the smart gas pipeline network device sensing network platform, and sending the inspection instruction to an inspection person corresponding to the smart gas user platform; updating a gas pipeline grid graph based on inspection data after inspecting each inspection area, wherein the inspection data is obtained from the smart gas user platform through the smart gas pipeline network device sensing network platform, wherein the gas pipeline grid graph refers to a graph used to represent a connection relationship of the gas pipeline network, the gas pipeline grid graph includes at least one node and at least one edge, wherein the node represents each grid area, and the edge represents a connection between adjacent grid areas, wherein a node feature of the gas pipeline grid graph includes a geographical feature of the grid area, whether a gas pipeline has been inspected, and an edge feature of the gas pipeline grid graph includes an inter-grid correlation coefficient, wherein the inter-grid correlation coefficient refers to a parameter that measures a degree of influence between grid areas at both ends of the edge and the grid area; determining at least one failure possibility of the at least one node or the at least one edge through a failure possibility determination model based on an updated gas pipeline grid graph, wherein the failure possibility determination model is a graph neural network model; determining a grid safety score based on the at least one failure possibility of the at least one node or the at least one edge through a safety score evaluation layer, and determining an updated inspection plan based on the grid safety score.

One or more embodiments of the present disclosure provide an Internet of Things system for safety inspection based on a smart gas geographic information system (GIS). The Internet of Things system includes a smart gas user platform, a smart gas service platform, a smart gas pipeline network safety management platform, a smart gas pipeline network device sensing network platform, and a smart gas pipeline network device object platform. The smart gas user platform includes a plurality of smart gas user sub-platforms. The smart gas service platform includes a plurality of smart gas service sub-platforms. The smart gas pipeline network safety management platform includes a plurality of smart gas pipeline network safety management sub-platforms and a smart gas data center. The smart gas pipeline network device sensing network platform is configured to interact with the smart gas data center and the smart gas pipeline network device object platform. The smart gas pipeline network device object platform is configured to obtain a geographical feature, a pipeline feature, and pipeline network historical data of a gas pipeline network based on an obtaining instruction. The smart gas pipeline network safety management platform is configured to: determine a gridding result through performing gridding processing on the gas pipeline network by a gridding algorithm based on a preset period, wherein the gridding result refers to each of a plurality of divided grid areas after the gridding processing and evaluation result corresponding to each of the plurality of divided grid areas; determine a required inspection area and an optional inspection area based on the gridding result, wherein the required inspection area refers to an area with frequent failures in a short term, and the optional inspection area refers to an area that has just been inspected in the short term and has no failures; generate a target inspection route based on the required inspection area and the optional inspection area; determine an inspection plan based on the target inspection route, wherein the inspection plan includes an inspection time, an inspection route, the required inspection area, and the optional inspection area; generate an inspection instruction through a preset generation algorithm based on the inspection plan, upload the inspection instruction to the smart gas service platform through the smart gas pipeline network device sensing network platform, and send the inspection instruction to an inspection person corresponding to the smart gas user platform; update a gas pipeline grid graph based on inspection data after inspecting each inspection area, wherein the inspection data is obtained from the smart gas user platform through the smart gas pipeline network device sensing network platform, wherein the gas pipeline grid graph refers to a graph used to represent a connection relationship of the gas pipeline network, the gas pipeline grid graph includes at least one node and at least one edge, wherein the node represents each grid area, and the edge represents a connection between adjacent grid areas, wherein a node feature of the gas pipeline grid graph includes a geographical feature of the grid area, whether a gas pipeline has been inspected, and an edge feature of the gas pipeline grid graph includes an inter-grid correlation coefficient, wherein the inter-grid correlation coefficient refers to a parameter that measures a degree of influence between grid areas at both ends of the edge and the grid area; determine at least one failure possibility of the at least one node or the at least one edge through a failure possibility determination model based on an updated gas pipeline grid graph, wherein the failure possibility determination model is a graph neural network model; determine a grid safety score based on the at least one failure possibility of the at least one node or the at least one edge through a safety score evaluation layer, and determine an updated inspection plan based on the grid safety score.

One or more embodiments of the present disclosure provide a non-transitory computer-readable storage medium. The storage medium stores computer instructions, and when a computer reads the computer instructions in the storage medium, the computer executes the method for safety inspection based on the smart gas geographic information system (GIS).

The embodiments of the present disclosure at least include the following beneficial effects: (1) By obtaining the geographical feature, the pipeline feature, and the pipeline network historical data of the gas pipeline network, and the count of gas pipeline network grades, and performing grading processing on the gas pipeline network to determine the inspection plan based on the grading result, rationality of the inspection plan can be improved, manpower and material resources can be saved, and inspection efficiency and inspection quality can be improved. (2) By generating a plurality of candidate inspection routes, selecting the target inspection route, and determining the inspection plan according to the target inspection route; and taking a factor such as the movement time, the inspection time, and the failure possibility of a gas pipeline in a corresponding area in an inspection process into account comprehensively, a determined inspection plan can become more comprehensive and reasonable, and inspection quality can be improved. (3) By periodically performing an adjustment on the inspection plan based on feedback data from an inspector, a subsequent inspection can be more targeted. (4) By performing gridding processing on the gas pipeline network, and determining whether a grid area is a required inspection area or an optional inspection area based on a failure possibility and environmental information of each grid area to generate the inspection plan, the determined inspection plan can be more refined, and the inspection quality can be improved.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
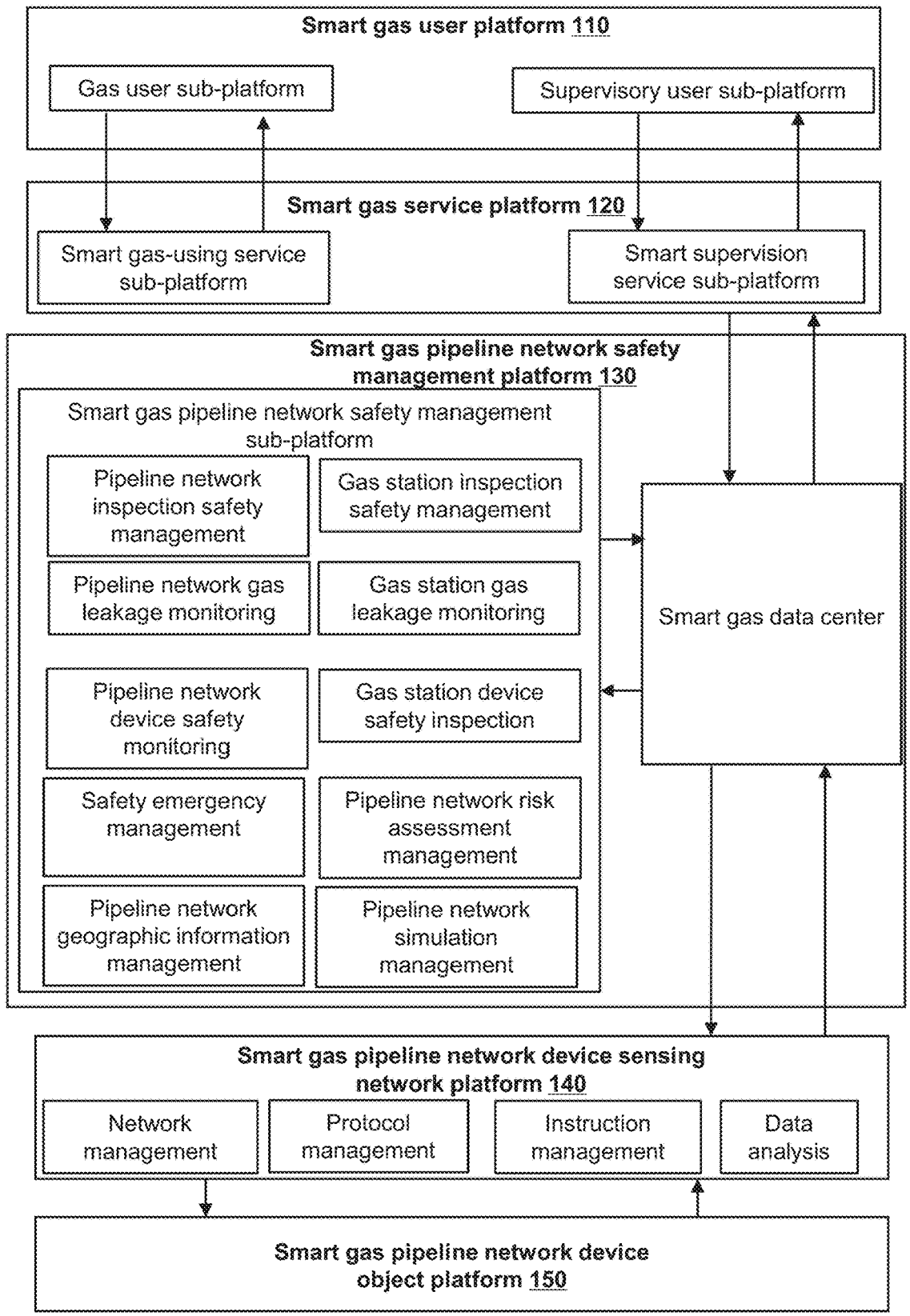
FIG. 1 is a diagram illustrating an exemplary platform structure of an Internet of Things system for determining a safety inspection plan based on a smart gas geographic information system (GIS) according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

Geographical features, pipeline features, and historical data of different gas pipeline networks are different, so failure possibilities are different, and inspection priority and inspection frequency are also different. In some embodiments of the present disclosure, when determining an inspection plan, it is necessary to perform grading processing on a gas pipeline network based on a geographical feature, a pipeline feature, and historical data of the gas pipeline network. Determining the inspection plan based on a grading result may improve inspection efficiency and inspection quality of the gas pipeline network.

FIG. 1 is a diagram illustrating an exemplary platform structure of an Internet of Things system for determining a safety inspection plan based on a smart gas geographic information system (GIS) according to some embodiments of the present disclosure. The Internet of Things system (which is referred to as the IoT system 100 hereinafter) for determining the safety inspection plan based on the smart gas GIS involved in the embodiments of the present disclosure may be described in detail below. It should be noted that the following embodiments are only used to illustrate the present disclosure, and do not constitute a limitation to the present disclosure.

As shown in FIG. 1, the IoT system 100 may include a smart gas user platform 110, a smart gas service platform 120, a smart gas pipeline network safety management platform 130, a smart gas pipeline network device sensing network platform 140, and a smart gas pipeline network device object platform 150.

The smart gas user platform 110 refers to a platform for interacting with a user. In some embodiments, the smart gas user platform 110 may be configured as a terminal device.

In some embodiments, the smart gas user platform 110 may include a gas user sub-platform and a supervisory user sub-platform. The gas user sub-platform may be a platform that provides a gas user with data related to gas use and solutions to gas problems. The gas user may be an industrial gas user, a commercial gas user, an ordinary gas user, etc. The supervisory user sub-platform may be a platform for a supervisory user to supervise an operation of a gas pipeline network. The supervisory user may be a member of a gas safety supervision department.

In some embodiments, the smart gas user platform 110 may feed back information to the user through the terminal device. For example, an updated gas inspection plan or an updated inspection instruction may be fed back to the supervisory user based on the supervisory user sub-platform.

The smart gas service platform 120 refers to a platform for conveying user requirements and control information. The smart gas service platform 120 may obtain the updated inspection plan or the updated inspection instruction from the smart gas pipeline network safety management platform 130 (e.g., a smart gas data center), and send them to the smart gas user platform 110.

In some embodiments, the smart gas service platform 120 may include a smart gas-using service sub-platform and a smart supervision service sub-platform. The smart gas-using service sub-platform may be a platform that provides a gas service for the gas user. The smart supervision service sub-platform may be a platform that provides a supervision requirement and a supervision solution for the supervisory user.

In some embodiments, the smart gas service platform may upload at least one updated gas inspection plan to the supervisory user sub-platform of the smart gas user platform 110 based on the supervision service sub-platform.

The smart gas pipeline network safety management platform 130 refers to a platform that provides functions of sensing management and control management for an Internet of Things operating system. In some embodiments, the smart gas pipeline network safety management platform includes a smart gas pipeline network safety management sub-platform and a smart gas data center.

The smart gas pipeline network safety management sub-platform may be configured to obtain a geographical feature, a pipeline feature, and pipeline network historical data of the gas pipeline network, and a count of gas pipeline network grades and determine the inspection plan. The smart gas data center may collect and store operation data of the IoT system 100.

In some embodiments, the smart gas pipeline network safety management platform 130 may perform data interaction with the smart gas pipeline network device sensing network platform 140 and the smart gas service platform 120 through the smart gas data center. The smart gas data center may transmit the inspection plan to the smart gas service platform 120.

In some embodiments, the smart gas pipeline network safety management sub-platform may include modules for implementing pipeline network inspection safety management, gas station inspection safety management, pipeline network gas leakage monitoring, gas station gas leakage monitoring, pipeline network device safety monitoring, gas station device safety inspection, safety emergency management, pipeline network risk assessment management, pipeline network geographic information management, and pipeline network simulation management, etc.

The smart gas pipeline network device sensing network platform 140 refers to a functional platform for managing sensing communication. In some embodiments, the smart gas pipeline network device sensing network platform 140 may be configured as a communication network and a gateway to implement functions of perceptual information sensing communication and control information sensing communication.

In some embodiments, the smart gas pipeline network device sensing network platform 140 may perform data interaction with the smart gas pipeline network safety management platform 130 through the smart gas data center; and perform data interaction with the smart gas pipeline network device object platform 150, etc.

The smart gas pipeline network device object platform 150 refers to a functional platform for obtaining perceptual information. In some embodiments, the smart gas pipeline network device object platform 150 may be configured as various types of gas pipeline network devices and monitoring devices. The monitoring devices may include temperature and humidity sensors of gas metering devices, etc.

More descriptions regarding the inspection plan, the geographical feature, the pipeline feature, and the pipeline network historical data may be found elsewhere in the present disclosure (e.g., FIG. 2) and related descriptions thereof.

It should be noted that the above description of the IoT system 100 and its components is only for convenience of description, and does not limit the present disclosure to the scope of the illustrated embodiments. It is understood that for those skilled in the art, after understanding the principle of the system, it is possible to arbitrarily combine the various components, or form a sub-system to connect with other components without departing from the principle.

Figure 2:
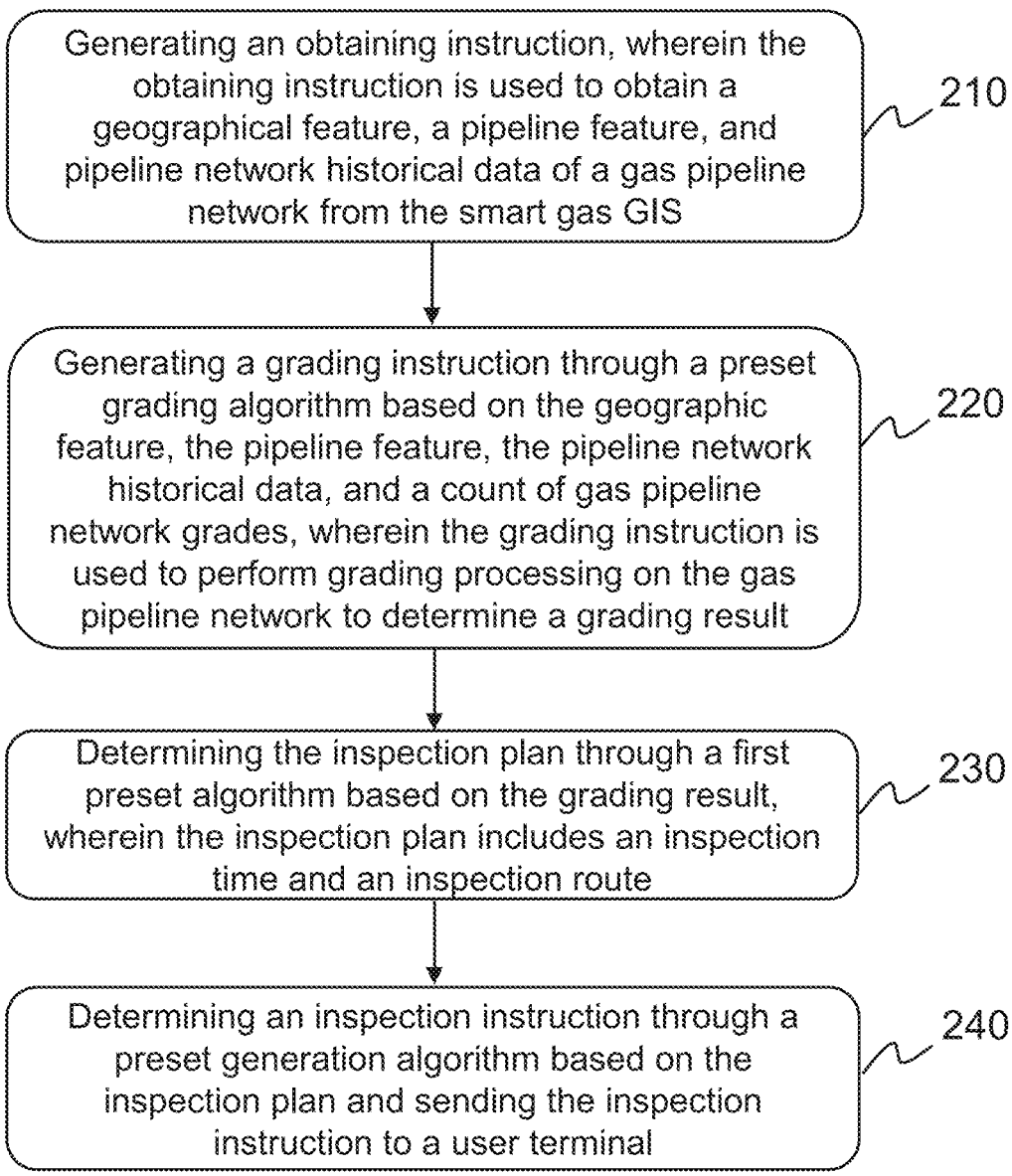
FIG. 2 is a flowchart illustrating an exemplary process for determining a safety inspection plan based on a smart gas geographic information system (GIS) according to some embodiments of the present disclosure.

FIG. 2 is a flowchart illustrating an exemplary process for determining a safety inspection plan based on a smart gas geographic information system (GIS) according to some embodiments of the present disclosure. As shown in FIG. 2, the process 200 may include the following operations. In some embodiments, the process 200 may be executed by the smart gas safety management platform 130.

In 210, generating an obtaining instruction, wherein the obtaining instruction is used to obtain a geographical feature, a pipeline feature, and pipeline network historical data of a gas pipeline network from the smart gas GIS.

The smart gas GIS system is an information system based on geographic information system (GIS) technology, which can provide required gas pipeline network information (e.g., pipeline distribution information, geographical location information of an inspection unit) to help implement functions of dynamic update, query statistics, pipeline network operation inspection, etc. of the gas pipeline network information.

The obtaining instruction refers to an instruction to obtain relevant data of the gas pipeline network.

The gas pipeline network is a pipeline distribution network formed by gas transmission pipelines and devices.

The geographic feature refers to a feature of a geographic location where the gas pipeline network is located. For example, the geographic feature may include a terrain environment, a location coordinate, etc.

The pipeline feature may include a material of the gas pipeline network, inner and outer diameters of the pipeline gas pipeline network, a count of gas pipeline branches, etc.

The pipeline network historical data may include historical inspection data such as a historical failure possibility or a historical impact range of the gas pipeline network.

In some embodiments, the smart gas pipeline network safety management platform 130 may obtain the geographical feature, the pipeline feature, and the pipeline network historical data of the gas pipeline network through the smart gas pipeline network device object platform 150. For example, the smart gas pipeline network safety management platform 130 may obtain the data and features from the smart gas GIS.

In 220, generating a grading instruction through a preset grading algorithm based on the geographic feature, the pipeline feature, the pipeline network historical data, and a count of gas pipeline network grades, wherein the grading instruction is used to perform grading processing on the gas pipeline network to determine a grading result.

The count of pipeline network grades refers to a count of grids that need to be divided when performing gridding processing on the gas pipeline network. The count of pipeline network grades may be set based on an empirical value or randomly.

The grading processing refers to an operation of dividing the gas pipeline network into different grades. The grading result refers to a specific grade (e.g., high-grade, medium-grade, low-grade) of the gas pipeline network.

In some embodiments, the smart gas pipeline network safety management platform 130 may determine a gas pipeline network grade through the preset grading algorithm based on the geographical feature, the pipeline feature, the pipeline network historical data, and the count of gas pipeline network grades. For example, the geographical feature, the pipeline feature, and the pipeline network historical data of the gas pipeline network are scored separately, and the scores are summed to determine a total score. The grading result is determined based on the total score, and the higher the total score, the higher the grade of the grading result.

In some embodiments, the smart gas pipeline network safety management platform 130 may determine the gas pipeline network grade through a grading preset table based on the geographical feature, the pipeline feature, the pipeline network historical data, and the count of gas pipeline network grades.

The grading preset table stores grading results of the gas pipeline networks corresponding to different geographical features, pipeline features, pipeline network historical data, and counts of pipeline network grades. The smart gas pipeline network safety management platform 130 may determine the grading result of the gas pipeline network by table look-up.

In 230, determining the inspection plan through a first preset algorithm based on the grading result, wherein the inspection plan includes an inspection time and an inspection route.

The inspection plan may include a time arrangement, a route arrangement, an inspection frequency, a specific inspection area, etc. related to the gas pipeline network inspection.

The inspection time is a time point when inspectors inspect the gas pipeline network. For example, the inspection time may be specified to a certain year, month, day, and time.

The inspection route is a route for the inspectors to inspect the gas pipeline network. For example, the inspection route may include an inspection sequence of gas pipeline networks located in different areas.

In some embodiments, the smart gas pipeline network safety management platform determines the inspection plan through the first preset algorithm based on the grading result may include prioritizing the gas pipeline network (e.g., sorting based on the grades in the grading result). Further, the smart gas pipeline network safety management platform may arrange an earlier inspection time, a higher inspection frequency, etc. on a gas pipeline network with a high priority; or determine the inspection route by determining the inspection sequence of an area where the gas pipeline network is located based on a priority order.

In some embodiments, the smart gas pipeline network safety management platform may determine the inspection plan based on a required inspection area and an optional inspection area. Specific descriptions may be found in FIG. 3 and related descriptions thereof.

In 240, determining an inspection instruction through a preset generation algorithm based on the inspection plan and sending the inspection instruction to a user terminal.

The user terminal is a mobile terminal device for inspectors to receive the inspection instruction.

The preset generation algorithm refers to an algorithm for generating the inspection instruction. For example, the preset generation algorithm may be an algorithm that automatically breaks down and recombines the inspection plan into the instruction. Exemplarily, a machine learning model capable of generating the inspection instruction through training may be taken as the preset generation algorithm.

The inspection instruction refers to an instruction instructing the inspectors to perform inspections. For example, the inspection instruction may include "a priority inspection area A," "the inspection route is XXX", etc.

In some embodiments, the smart gas pipeline network safety management platform 130 may send the inspection plan to the user terminal through the smart gas user platform 110.

In some embodiments of the present disclosure, the smart gas pipeline network safety management platform 130 obtains the geographical feature, the pipeline feature, and the pipeline network historical data of the gas pipeline network, and the count of gas pipeline network grades through the gas GIS, and performs the grading processing on the gas pipeline network to determine the inspection plan based on the grading result, which improves rationality of the inspection plan, saves manpower and material resources, and improves inspection efficiency and inspection quality.

It should be noted that the above description of the process 200 is only for example and illustration, and does not limit the scope of application of the present disclosure. For those skilled in the art, various modifications and changes may be made to the process 200 under the guidance of the present disclosure. However, these modifications and changes are still within the scope of the present disclosure.

Figure 3:
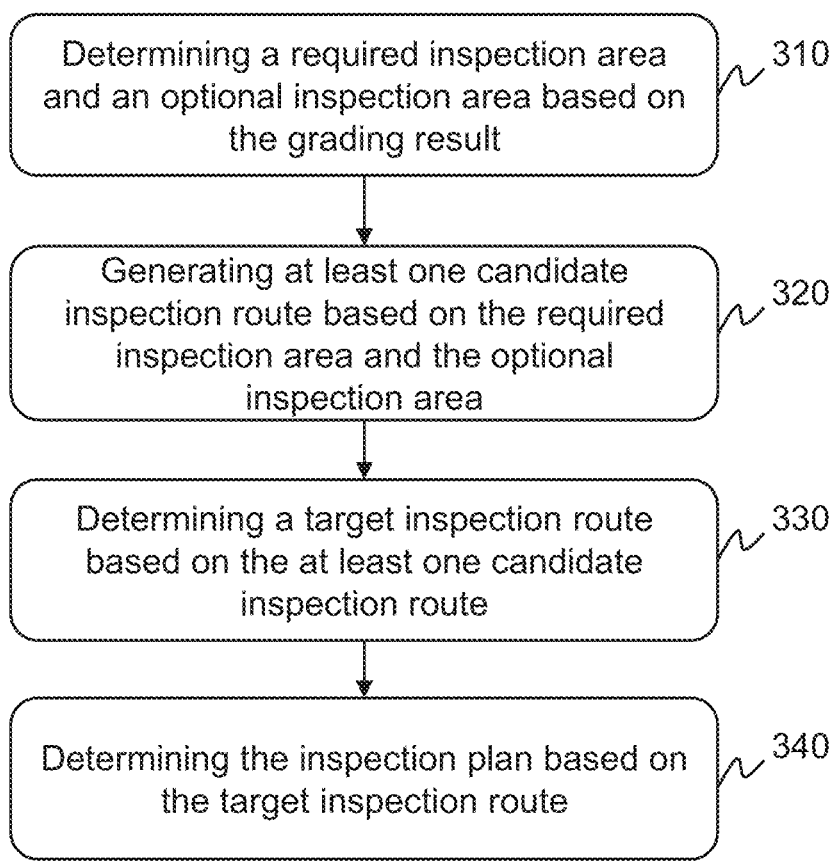
FIG. 3 is a flowchart illustrating an exemplary process for determining an inspection plan based on a grading result according to some embodiments of the present disclosure.

FIG. 3 is a flowchart illustrating an exemplary process for determining an inspection plan based on a grading result according to some embodiments of the present disclosure. As shown in FIG. 3, the process 300 may include the following operations. In some embodiments, the process 300 may be executed by the smart gas safety management platform 130.

In 310, determining a required inspection area and an optional inspection area based on the grading result.

The required inspection area refers to an inspection area that is required to be inspected in the inspection plan.

The optional inspection area refers to an inspection area that is not required to be inspected in the inspection plan.

In some embodiments, the smart gas safety management platform 130 may determine the required inspection area and the optional inspection area through a first preset algorithm (e.g., by querying a preset table) based on the grading result. The preset table stores different grading results and inspection area types (i.e., the required inspection area or the optional inspection area) corresponding the different grading results.

In some embodiments, the smart gas safety management platform 130 may also determine the required inspection area and the optional inspection area based on an inspection frequency and an inspection situation of each inspection area. For example, the smart gas safety management platform 130 may determine an area with frequent failures in a short term as the required inspection area; and determine an area that has just been inspected recently and has no failures as the optional inspection area, etc.

In some embodiments, the smart gas pipeline network safety management platform 130 may determine a gridding result through performing gridding processing on a gas pipeline network; and determine the required inspection area and the optional inspection area based on the gridding result.

The gridding processing refers to a process in which an inspection area of the gas pipeline network is divided by gridding based on a preset gridding standard, and a plurality of divided inspection grid areas are evaluated based on a factor such as safety of a gas pipeline or a surrounding environment to determine an evaluation result.

The gridding result refers to each of the plurality of divided grid areas after the gridding processing and the evaluation result corresponding to each of the plurality of divided grid areas. For example, the evaluation result may include a failure possibility of each grid area.

In some embodiments, the smart gas pipeline network safety management platform 130 may determine a plurality of grid areas by dividing the inspection area of the gas pipeline network based on a preset division area; and determine the evaluation result based on environmental information and a gas pipeline condition (e.g., a service duration, a degree of damage) of the grid area. For example, the smart gas safety management platform 130 may determine the evaluation result based on a failure possibility corresponding to historical environmental information and a historical gas pipeline condition that are the same as environmental information and a gas pipeline condition of a current grid area in historical data. The higher the evaluation result, the lower the gas pipeline failure possibility of a grid area corresponding to the evaluation result.

In some embodiments, the smart gas safety management platform 130 may directly determine the required inspection area and the optional inspection area based on the gridding result. For example, if an evaluation result corresponding to a grid area is lower than a preset threshold, the grid area is determined as the required inspection area. If an evaluation result corresponding to a grid area is higher than a preset threshold, the grid area is determined as the optional inspection area. More descriptions regarding the gridding processing and the gridding result may be found in FIG. 4 and related descriptions thereof.

In some embodiments of the present disclosure, the gridding processing is performed on the gas pipeline network, and the required inspection area and the optional inspection area is orderly determined based on the gridding result, which avoids repeated inspections and improve inspection efficiency In 320, generating at least one candidate inspection route based on the required inspection area and the optional inspection area.

The candidate inspection route refers to a candidate inspection route that may become a target inspection route.

In some embodiments, the candidate inspection route may be determined based on a geographic location of the required inspection area and a geographic location of the optional inspection area. For example, the at least one candidate inspection route is determined by arranging geographically adjacent required inspection areas or optional inspection areas in sequence.

In some embodiments, the smart gas pipeline network safety management platform 130 may generate the at least one candidate inspection route and at least one inspection movement time according to the geographic location of the area based on the required inspection area and the optional inspection area.

The geographic location of the area refers to location coordinates of the inspection area (e.g., the required inspection area), which may be obtained through a smart gas GIS.

The inspection movement time refers to a total time required for inspectors to move between different inspection areas in the candidate inspection route. The inspection movement time does not include a time spent in moving within each inspection area.

In some embodiments, the smart gas pipeline network safety management platform 130 may generate the at least one candidate inspection route by randomly arranging a plurality of inspection areas and the optional inspection area based on the geographic location of each of the plurality of inspection areas.

In some embodiments, the smart gas pipeline network safety management platform 130 may determine a distance between any two inspection locations by combining location information and route information of the inspection area in each candidate inspection route and obtain a plurality of distances. The inspection movement time of the candidate inspection route may be determined by dividing a total distance by a preset movement speed. The location information and the route information of the inspection area are obtained based on the smart gas GIS.

In some embodiments of the present disclosure, the smart gas safety management platform 130 provides data support for a subsequent determination of the target inspection route by generating the candidate inspection route and determining the inspection movement time of each candidate inspection route, thereby improving rationality of determining the inspection route.

In 330, determining a target inspection route based on the at least one candidate inspection route.

The target inspection route refers to an inspection route for a final inspection.

In some embodiments, the smart gas pipeline network safety management platform 130 may screen at least one candidate route based on a preset rule to determine the target inspection route therefrom. The preset rule may include inspection routes being more convenient and inspection efficiency being higher.

In some embodiments, the smart gas pipeline network safety management platform 130 may select a candidate inspection route with a shortest inspection movement time as the target inspection route based on the at least one candidate inspection route and the at least one inspection movement time.

In some embodiments of the present disclosure, the smart gas safety management platform 130 designates the candidate inspection route with the shortest inspection movement time as the target inspection route, which reduces the inspection movement time of inspectors, avoids waste of manpower, and improves inspection efficiency.

In 340, determining the inspection plan based on the target inspection route.

In some embodiments, the smart gas pipeline network safety management platform 130 may determine the inspection plan according to the target inspection route and a preset inspection rule. The preset inspection rule may include an inspection time rule, an inspection frequency, etc., which is not limited in the present disclosure.

In some embodiments, the smart gas pipeline network safety management platform 130 may determine the inspection time through a time preset table based on the target inspection route, an environmental factor, and a failure possibility of the required inspection area. The environmental factor may include air humidity and air velocity. The failure possibility of the required inspection area includes a highest failure possibility and a lowest failure possibility.

In some embodiments, the smart gas pipeline network safety management platform 130 may determine an inspection interval by retrieving in the time preset table based on the target inspection route, a corresponding environmental factor, and the failure possibility of the required inspection area in the target inspection route. Further, the smart gas pipeline network safety management platform 130 may determine a next inspection time based on a last inspection time and the inspection interval. More descriptions regarding the inspection time may be found in FIG. 2.

The time preset table stores a plurality of different sets of air humidity, air velocity, different highest failure possibilities and lowest failure possibilities of the required inspection area, and corresponding inspection intervals. The time preset table may be preset based on experience.

The failure possibility of the required inspection area refers to a failure possibility of the gas pipeline in the required inspection area, which may be obtained based on an average of failure possibilities of a plurality of historical times in the area.

The highest failure possibility refers to a maximum value of failure possibilities of a plurality of inspection areas in the target inspection route. Similarly, the minimum failure possibility refers to a minimum value of failure possibilities of the plurality of inspection areas in the target inspection route.

In some embodiments, the smart gas pipeline network safety management platform 130 may generate the inspection plan based on the inspection time and the target inspection route.

In some embodiments of the present disclosure, the inspection time is determined through the time preset table, which comprehensively takes the environmental factor of the target inspection route and the failure possibility of the required inspection area into account, thereby improving accuracy of determining the inspection time.

In some embodiments of the present disclosure, the smart gas safety management platform 130 determines the required inspection area and the optional inspection area, generate the plurality of candidate inspection routes, screens the target inspection route from the plurality of candidate inspection routes, and determines the inspection plan according to the target inspection route; and takes the factor such as the movement time, the inspection time, and the failure possibility of the gas pipeline of a corresponding area in an inspection process into account comprehensively, so that a determined inspection plan becomes more comprehensive and reasonable, thereby improving inspection efficiency and quality.

In some embodiments, the smart gas pipeline network safety management platform 130 may perform gridding processing on a gas pipeline network space through a gridding algorithm based on a preset period.

The preset period may be set according to experience or actual needs.

The gridding algorithm refers to a rule for performing the gridding processing on an area with the gas pipeline network. For example, the gridding algorithm may include a gridding clustering algorithm, a butterfly algorithm, a loop algorithm, or the like, or any combination thereof. The gridding algorithm may be set according to experience or actual needs.

In some embodiments, when the gridding processing is performed on the gas pipeline network, it is determined whether a grid meets one of splitting conditions after an initial gridding division processing is performed on the gas pipeline network space based on a preset count of pipeline network grades. When the grid meets one of the splitting conditions, a splitting process on the grid ends. The splitting process refers to a process of splitting the grid into two from the middle.

When all grids corresponding to the gas pipeline network meet at least any one of the splitting conditions, the gridding processing on the gas pipeline network is completed, and a division result of the grid is determined. More descriptions regarding the splitting conditions may be found below.

In some embodiments, the smart gas pipeline network safety management platform 130 may periodically perform the gridding processing on the gas pipeline network based on the preset period.

In some embodiments, parameters of the gridding algorithm include a grid safety failure possibility and the splitting condition, and the grid safety failure possibility and the splitting condition may be used to judge whether to stop the gridding process on the gas pipeline network. In some embodiments, the grid safety failure possibility is determined based on a possibility prediction layer, which is a machine learning model.

The splitting condition refers to a condition of whether to continue to divide the grid when the gridding processing is performed on the gas pipeline network space.

In some embodiments, the splitting condition includes that the grid safety failure possibility is smaller than a splitting threshold, the splitting threshold is related to gas safety processing efficiency, and the gas safety processing efficiency is related to a historical inspection time.

The splitting threshold refers to a critical value of the grid safety failure possibility when the grid area is divided. When the grid safety failure possibility is smaller than the splitting threshold, the grid may not be further divided.

In some embodiments, the splitting threshold=k×gas safety processing efficiency, k denotes a preset constant.

The gas safety processing efficiency refers to actual efficiency of the inspector in dealing with gas pipeline failures. The gas safety processing efficiency is equal to a minimum value of ratios of an area of a historical inspection area to the historical inspection time.

The historical inspection time refers to a time when the inspector completes inspecting a certain historical inspection area during a historical inspection.

In some embodiments of the present disclosure, the smart gas safety management platform 130 divides the gas area by determining the splitting threshold, which may improve rationality of the gridding processing.

In some embodiments, the splitting condition also includes that there is only one gas pipeline section in the grid; or a space volume of the grid is smaller than a volume threshold. The volume threshold may be preset.

In some embodiments of the present disclosure, the smart gas safety management platform 130 judges whether to stop the gridding processing on the gas pipeline network in combination with the grid safety failure possibility and the splitting condition, which helps to reasonably divide the gas area.

The grid safety failure possibility refers to a failure possibility of the gas pipeline in each grid area.

More descriptions regarding determining the grid safety failure possibility based on the possibility prediction layer may be found below.

Figure 4:
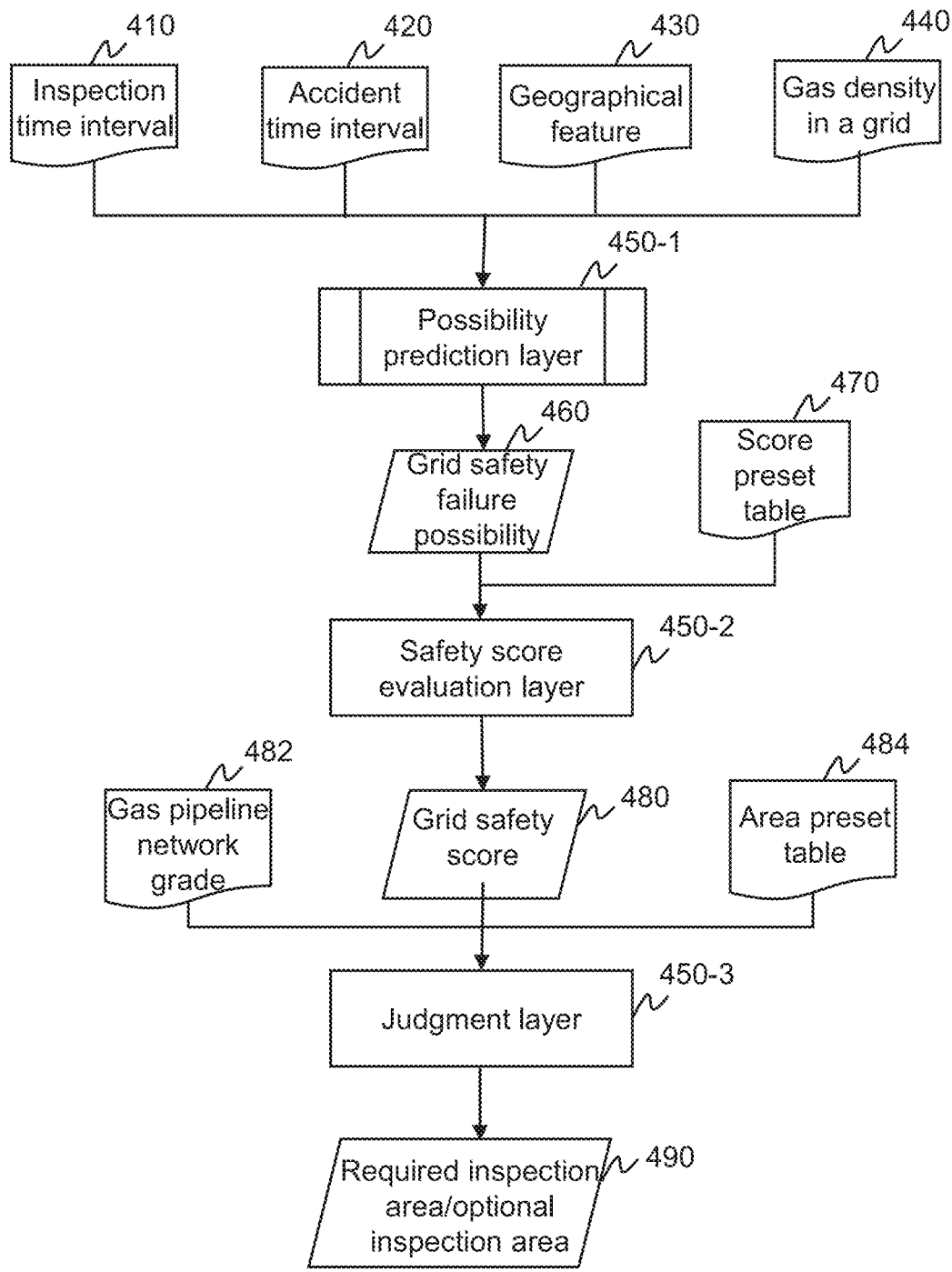
FIG. 4 is an exemplary schematic diagram illustrating determining a required inspection area and an optional inspection area based on a possibility prediction layer according to some embodiments of the present disclosure.

FIG. 4 is an exemplary schematic diagram illustrating determining a required inspection area and an optional inspection area based on a possibility prediction layer according to some embodiments of the present disclosure.

In some embodiments, the possibility prediction layer may be a machine learning model.

As shown in FIG. 4, the smart gas pipeline network safety management platform 130 may determine a grid safety failure possibility 460 by processing an inspection time interval 410, an accident time interval 420, a geographical feature 430, and a gas density 440 in a grid based on the possibility prediction layer 450-1. The smart gas pipeline network safety management platform 130 may determine a grid safety score 480 by retrieving in a score preset table 470 through a safety score evaluation layer 450-2 based on the grid safety failure possibility 460. The smart gas pipeline network safety management platform 130 may determine whether a grid area is a required inspection area or an optional inspection area 490 by retrieving in an area preset table 484 through a judgment layer 450-3 based on the grid safety score 480 and a gas pipeline network grade 482.

A network structure of the possibility prediction layer 450-1 may be a convolutional neural network, a deep neural network, a recurrent neural network, or any combination thereof.

In some embodiments, the possibility prediction layer may be obtained by training through a gradient descent algorithm, etc. A first training sample for training the possibility prediction layer may be determined based on historical data. A first label is a subsequent actual failure possibility corresponding to the first training sample, which may be determined by labeling based on historical data.

The inspection time interval 410 refers to a time interval from a current moment to a time of a last inspection of a certain grid area. The inspection time interval 410 may be obtained by a timer, or calculated based on a historical inspection time.

The accident time interval 420 refers to a time interval between the current moment of a grid area and a time of a last accident, which may be calculated and obtained based on a historical accident time.

More descriptions regarding the geographical feature 430 may be found in FIG. 2 and related descriptions thereof.

The gas density 440 in the grid refers to a ratio of a gas pipeline volume contained in the grid area to a total volume of the grid.

The score preset table 470 refers to a table storing a plurality different sets of grid safety failure possibilities and grid safety scores corresponding to the grid safety failure possibilities. The score preset table 470 may be preset according to the historical data.

The grid safety score 480 refers to a score that evaluates a safety degree of gas pipelines in the grid area or a degree to which gas pipelines in the grid area are less prone to failure).

An area preset table 484 refers to a table that stores a plurality different sets of grid safety scores, different gas pipeline network grades, and corresponding area types (e.g., the required inspection area or the optional inspection area). One set of grid safety score and gas pipeline network grade corresponds to one area type. The area preset table 482 may be preset based on the historical data.

More descriptions regarding the gas pipeline network grade 482 may be found in FIG. 2 and related descriptions thereof.

In some embodiments of the present disclosure, the smart gas safety management platform 130 determines whether the grid area is the required inspection area or the optional inspection area based on various preset tables and parameters (e.g., the geographical feature, the gas pipeline network grade, the accident time interval, the inspection time interval) related to a gas pipeline network, which takes into account the influence of various factors in the grid area on the inspection and improves accuracy of determining an inspection area.

In some embodiments of the present disclosure, combined with a gridding algorithm, the smart gas safety management platform 130 performs the gridding processing on the gas pipeline network based on a preset period, which helps to update a gridding result reasonably and effectively.

Figure 5:
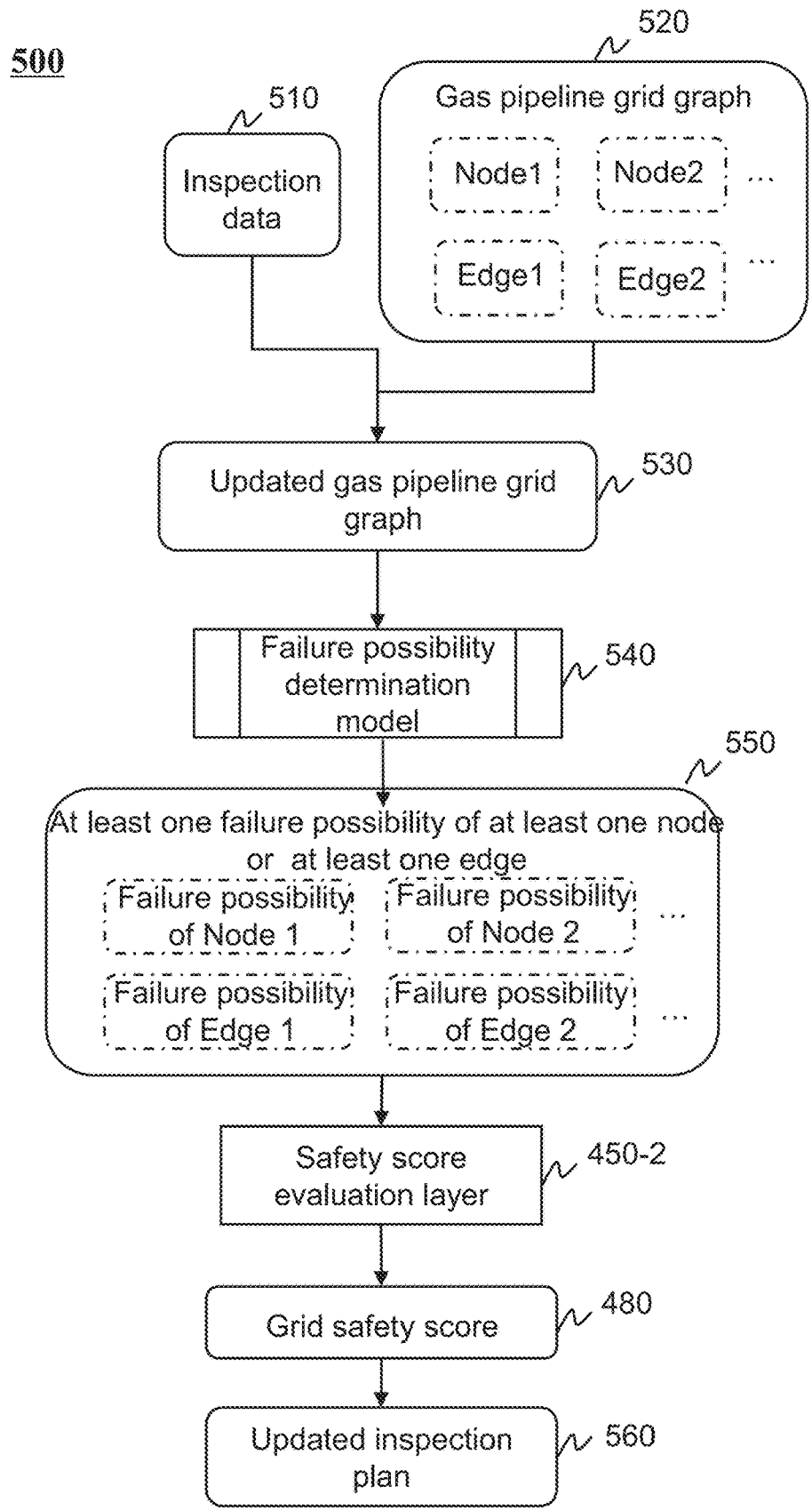
FIG. 5 is an exemplary schematic diagram illustrating periodically performing an adjustment on an inspection plan according to some embodiments of the present disclosure.

FIG. 5 is an exemplary schematic diagram illustrating periodically performing an adjustment on an inspection plan according to some embodiments of the present disclosure.

In some embodiments, the smart gas pipeline network safety management platform 130 may obtain feedback data from a user terminal; and periodically perform the adjustment on the inspection plan through a second preset algorithm based on the feedback data. The adjustment includes determining at least one required inspection area as an optional inspection area and/or determining at least one optional inspection area as a required inspection area.

The feedback data refers to specific inspection data or a specific inspection result of a user (e.g., inspector). The feedback data may reflect information of the required inspection area selected from the optional inspection area and the optional inspection area selected from the required inspection area by the user.

In some embodiments, the smart gas pipeline network safety management platform 130 may obtain the feedback data input by the user from a terminal device through the smart gas user platform 110.

The second preset algorithm refers to an algorithm used for periodically adjusting the inspection plan.

In some embodiments, the smart gas pipeline network safety management platform 130 periodically performing the adjustment on the inspection plan through the second preset algorithm may include: periodically performing the adjustment on an inspection area based on the feedback data; and updating the inspection plan based on the adjusted inspection area. For example, the smart gas safety management platform 130 determines an updated inspection area by updating an original required inspection area and an original optional inspection area based on the required inspection area and the optional inspection area selected by the user; and adjusts the inspection plan through the manner in the operation 230 based on the updated inspection area.

In some embodiments of the present disclosure, the smart gas pipeline network safety management platform 130 periodically performs the adjustment on the inspection plan based on the feedback data, so that the inspection plan is more practical and the inspection is more targeted.

In some embodiments, the smart gas pipeline network safety management platform periodically performs the adjustment on the inspection plan through the second preset algorithm, which may also be implemented by the manner shown in FIG. 5.

In some embodiments, as shown in FIG. 5, the smart gas pipeline network safety management platform 130 may update a gas pipeline grid graph 520 based on inspection data 510 after inspecting each inspection area. The gas pipeline grid graph 520 may be determined based on a gridding result. The gas pipeline grid graph 520 includes at least one node and at least one edge. The smart gas pipeline network safety management platform 130 may determine at least one failure possibility 550 of the at least one node or the at least one edge through a failure possibility determination model 540 based on an updated gas pipeline grid graph 530. The failure possibility determination model 540 is a machine learning model. The smart gas pipeline network safety management platform 130 may determine a grid safety score 480 by retrieving in a score preset table based on the at least one failure possibility 550 of the at least one node or the at least one edge through the safety score evaluation layer 450-2. The smart gas pipeline network safety management platform 130 may determine an updated inspection plan 560 based on the grid safety score 480. More descriptions regarding the safety score evaluation layer may be found in FIG. 4 and the related descriptions thereof.

The inspection data refers to data related to a gas pipeline network obtained by the inspector after an inspection. For example, the inspection data may include environmental information, gas pipeline failure situation (e.g., whether a gas pipeline is damaged, a degree of damage, and a count of missing parts), etc. of each grid area.

In some embodiments, the smart gas pipeline network safety management platform 130 may determine an evaluation result of each grid area based on the inspection data to update the gridding result; and update the gas pipeline grid graph based on the updated gridding result. Updating the gridding result based on the evaluation result may be updating an original evaluation result of each grid area in an original gridding result using the evaluation result. More descriptions regarding the evaluation result may be found in FIG. 3 and related descriptions thereof.

In some embodiments, the gas pipeline grid graph may be determined or updated based on the gridding result. For example, the smart gas pipeline network safety management platform 130 may use each grid area in the gridding result as the node, and a connection between adjacent grid areas as the edge to construct the gas pipeline grid graph. Updating the gas pipeline grid graph may be that a relevant feature of the gas pipeline grid graph is updated based on the updated gridding result.

The gas pipeline grid graph refers to a graph used to represent a connection relationship of the gas pipeline network.

A node feature of the gas pipeline grid graph may include a geographical feature of the grid area, the grid safety score, whether the gas pipeline has been inspected, etc. More descriptions regarding the geographical feature and the grid safety score may be found elsewhere in the present disclosure (e.g., FIG. 2).

In some embodiments, an edge feature of the gas pipeline grid graph includes an inter-grid correlation coefficient.

The inter-grid correlation coefficient refers to a parameter that measures a degree of influence between grids at both ends of the edge. For example, the inter-grid correlation coefficient may measure the degree to which grid A influence whether grid B fails, etc.

In some embodiments, the inter-grid correlation coefficient may be calculated based on a co-occurrence frequency between grids in a historical inspection plan.

The co-occurrence frequency between grids refers to a frequency at which two grids are simultaneously used as inspection areas in a same historical inspection in a plurality of historical inspection plans.

In some embodiments, the co-occurrence frequency may be determined directly as the inter-grid correlation coefficient. Specifically: the inter-grid correlation coefficient between grid A and grid B=the co-occurrence frequency=a count of co-occurrences of grid A and grid B/(a count of occurrences of grid A+a count of occurrences of grid B).

In some embodiments of the present disclosure, the inter-grid correlation coefficient is calculated based on the co-occurrence frequency between grids in the historical inspection plan, which can improve accuracy of the inter-grid correlation coefficient and provide reliable data support for a subsequent determination of a failure possibility of the at least one node or the at least one edge.

In some embodiments, the failure possibility determination model is a machine learning model, e.g., a graph neural network (GNN) model.

The failure possibility of the at least one node or the at least one edge refers to a failure possibility in at least one grid area or between grid areas in the gas pipeline grid graph.

In some embodiments, the failure possibility determination model may be obtained based on training. A training algorithm may be a gradient descent algorithm, etc.

A second training sample of the failure possibility determination model includes a sample gas pipeline grid graph, and a second label is an actual failure possibility of each node/edge in the sample gas pipeline grid graph. The second training sample and the second label may be determined based on historical data.

An updated inspection area includes a new required inspection area and a new optional inspection area.

In some embodiments, after the safety score evaluation layer 450-2 determines the grid safety score 480, the smart gas pipeline network safety management platform 130 may determine and update the inspection area based on the grid safety score 480. For example, based on the grid safety score of each grid area in the inspection area, each grid area is determined as the required inspection area or the optional inspection area by the manner in FIG. 4, and the updated inspection area is obtained. Based on the updated inspection plan (i.e., an updated required inspection area and an updated optional inspection area), the updated inspection plan is determined through the manner in the operations 320-340.

More descriptions regarding the safety score evaluation layer may be found in FIG. 4 and related descriptions thereof.

As shown in some embodiments of the present disclosure, the failure possibility of the at least one node or the at least one edge in the gas pipeline grid graph is determined through the failure possibility determination model, and the failure possibility of the at least one node or the at least one edge is processed through the safety score evaluation layer, and then the updated inspection plan is determined, which effectively improves rationality of the inspection plan.

One or more embodiments of the present disclosure provide a non-transitory computer-readable storage medium, which stores computer instructions. When a computer reads the computer instructions in the storage medium, the computer executes the method for determining the safety inspection plan based on the smart gas GIS.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for safety inspection based on a smart gas geographic information system (GIS), wherein the method is implemented by an Internet of Things system for safety inspection based on the smart gas GIS, the Internet of Things system includes a smart gas user platform, a smart gas service platform, a smart gas pipeline network safety management platform, a smart gas pipeline network device sensing network platform, and a smart gas pipeline network device object platform, wherein the smart gas user platform includes a terminal device, the terminal device is configured to feed back information to a user, receive an inspection instruction, and obtain feedback data input by the user, the smart gas service platform includes a first server, the first server is configured to convey user requirements and control information and send the user requirements and the control information to the terminal device, the smart gas pipeline network safety management platform includes a second server and a smart gas data center, the second server is configured to obtain a geographical feature, a pipeline feature, and pipeline network historical data of a pas pipeline network, and a count of gas pipeline network grades and determine the inspection plan, the smart gas data center is configured to collect and store operation data of the Internet of Things system, the smart gas pipeline network device sensing network platform includes a communication network and a gateway, the communication network and the gateway are configured to implement perceptual information sensing communication and control the information sensing communication, the smart gas pipeline network safety management platform performs data interaction with the smart gas pipeline network device sensing network platform and the smart gas service platform through the smart gas data center, and the smart gas pipeline network device object platform includes various types of gas pipeline network devices and monitoring devices, the monitoring devices include temperature and humidity sensors of gas metering devices, the method comprising: obtaining the geographical feature, the pipeline feature, and the pipeline network historical data of the gas pipeline network through the various types of gas pipeline network devices and the monitoring devices of the smart gas pipeline network device object platform, wherein the gas pipeline network is a pipeline distribution network formed by gas transmission pipelines and devices, the geographic feature refers to a feature of a geographic location where the gas pipeline network is located, the geographic feature includes a terrain environment and a location coordinate, the pipeline feature includes a material of the gas pipeline network, inner and outer diameters of the pipeline gas pipeline network, a count of gas pipeline branches, the pipeline network historical data includes a historical failure possibility and a historical impact range of the gas pipeline network, determining a gridding result through performing gridding processing on the gas pipeline network by a gridding algorithm based on a preset period based on the geographical feature, the pipeline feature, and the pipeline network historical data of the gas pipeline network, wherein the gridding result refers to each of a plurality of divided grid areas after the gridding processing and evaluation result corresponding to each of the plurality of divided grid areas, and the gridding processing refers to a process in which an inspection area of the gas pipeline network is divided by gridding based on a preset gridding standard and a plurality of divided inspection grid areas are evaluated based on a factor including safety of a gas pipeline and a surrounding environment to determine the evaluation result; determining a required inspection area and an optional inspection area based on the gridding result, wherein the required inspection area refers to an area with multiple failures have occurred in the past frequent failures in a short term, and the optional inspection area refers to an area that has already been inspected in the short term and has no failures; generating a target inspection route based on the required inspection area and the optional inspection area, including: determining a grid safety failure possibility by processing an inspection time interval, an accident time interval, the geographical feature, and a gas density in a grid based on a possibility prediction layer, wherein the gas density in the grid is obtained by the monitoring devices of the smart gas pipeline network device object platform, the possibility prediction layer is a deep neural network model, the possibility prediction layer is obtained by training through a gradient descent algorithm, a first training sample for training the possibility prediction layer is determined based on historical data, and a first label for training the possibility prediction layer is a subsequent actual failure possibility corresponding to the first training sample; determining a grid safety score by retrieving in a score preset table through a safety score evaluation layer based on the grid safety failure possibility, wherein the score preset table refers to a table storing grid safety failure possibilities of a plurality different sets of nodes or edges and grid safety scores corresponding to the grid safety failure possibility, and the score preset table is preset according to historical data; and determining whether a grid area is the required inspection area or the optional inspection area by retrieving in an area preset table through a judgment layer based on the grid safety score and a gas pipeline network grade; determining an inspection plan based on the target inspection route, wherein the inspection plan includes an inspection time, an inspection route, the required inspection area, and the optional inspection area; generating the inspection instruction through a preset generation algorithm based on the inspection plan, uploading the inspection instruction to the first server of the smart gas service platform through the communication network and the gateway of the smart gas pipeline network device sensing network platform, and sending the inspection instruction to the terminal device used by an inspection person corresponding to the smart gas user wherein the preset generation algorithm is a machine learning model capable of generating the inspection instruction through training; updating a gas pipeline grid graph based on inspection data after inspecting each inspection area, wherein the inspection data is obtained from the terminal device of the smart gas user platform through the smart gas pipeline network device sensing network platform, wherein the inspection data includes environmental information and gas pipeline failure situation, the gas pipeline grid graph refers to a graph used to represent a connection relationship of the gas pipeline network, the gas pipeline grid graph includes at least one node and at least one edge, wherein the node represents each grid area, and the edge represents a connection between adjacent grid areas, wherein a node feature of the gas pipeline grid graph includes the geographical feature of the grid area, whether a gas pipeline has been inspected, and an edge feature of the gas pipeline grid graph includes an inter-grid correlation coefficient, wherein the inter-grid correlation coefficient refers to a parameter that measures a degree of influence between grid areas at both ends of the edge and the grid area; determining at least one failure possibility of the at least one node or the at least one edge through a failure possibility determination model based on an updated gas pipeline grid graph, wherein the failure possibility determination model is a graph neural network model, the failure possibility determination model is obtained based on the gradient descent algorithm, a second training sample of the failure possibility determination model includes a sample gas pipeline grid graph, and a second label is an actual failure possibility of each node/edge in the sample gas pipeline grid graph, the second training sample and the second label is determined based on the historical data; determining a grid safety score by retrieving in a score preset table based on the at least one failure possibility of the at least one node or the at least one edge through the safety score evaluation layer, and determining an updated inspection plan based on the grid safety score.

2. The method according to claim 1, wherein the generating a target inspection route based on the required inspection area and the optional inspection area includes:
generating at least one candidate inspection route and at least one inspection movement time according to the geographic location of an area based on the required inspection area and the optional inspection area, wherein one of the at least one candidate inspection route corresponds to one of the at least one inspection movement time; and
determining the target inspection route based on the at least one candidate inspection route.

3. The method according to claim 2, wherein the determining the target inspection route based on the at least one candidate inspection route includes:
selecting a candidate inspection route with a shortest inspection movement time as the target inspection route based on the at least one candidate inspection route and the at least one inspection movement time.

4. The method according to claim 1, wherein the determining an inspection plan based on the target inspection route includes:
determining the inspection time through a time preset table based on the target inspection route, an environmental factor, and a second failure possibility of the required inspection area, wherein
the environmental factor includes air humidity and air velocity, and the second failure possibility of the required inspection area includes a highest failure possibility and a lowest failure possibility.

5. The method according to claim 1, wherein parameters of the gridding algorithm include the grid safety failure possibility and a splitting condition, wherein the grid safety failure possibility and the splitting condition are used to judge whether to stop the gridding processing on the gas pipeline network.

6. The method according to claim 5, wherein the splitting condition includes a splitting threshold, the splitting threshold is related to gas safety processing efficiency, and the gas safety processing efficiency is related to a historical inspection time.

7. The method according to claim 1, further comprising:
generating an obtaining instruction, wherein the obtaining instruction is used to obtain the geographical feature, the pipeline feature, and the pipeline network historical data of the gas pipeline network from the smart gas GIS and upload the geographical feature, the pipeline feature, and the pipeline network historical data to the smart gas pipeline network safety management platform;
obtaining the count of the gas pipeline network grades from the smart gas user platform through the smart gas pipeline network device sensing network platform; and
determining the gas pipeline network grade through a grading preset table based on the geographical feature, the pipeline feature, the pipeline network historical data, and the count of the gas pipeline network grades.

8. The method according to claim 1, further comprising:
periodically performing an adjustment on the inspection plan through a second preset algorithm based on the feedback data; wherein
the adjustment includes determining at least one required inspection area as the optional inspection area or determining at least one optional inspection area as the required inspection area.

9. The method according to claim 1, wherein the inter-grid correlation coefficient is calculated based on a co-occurrence frequency between grids in a historical inspection plan, wherein the co-occurrence frequency between grids refers to a frequency at which two grids are simultaneously used as inspection areas in a same historical inspection in a plurality of historical inspection plans.

10. The Internet of Things system according to claim 9, wherein the inter-grid correlation coefficient is calculated based on a co-occurrence frequency between grids in a historical inspection plan, and the co-occurrence frequency between grids refers to a frequency at which two grids are simultaneously used as inspection areas in a same historical inspection in a plurality of historical inspection plans.

11. An Internet of Things system for safety inspection based on a smart gas geographic information system (GIS), wherein the Internet of Things system includes a smart gas user platform, a smart gas service platform, a smart gas pipeline network safety management platform, a smart gas pipeline network device sensing network platform, and a smart gas pipeline network device object platform, the smart gas user platform including a terminal device, the terminal device is configured to feed back information to a user, receive an inspection instruction, and obtain feedback data input by the user, the smart gas service platform including a first server, the first server is configured to convey user requirements and control information and send the user requirements and the control information to the terminal device, the smart gas pipeline network safety management platform including a second server and a smart gas data center, the second server is configured to obtain a geographical feature, a pipeline feature, and pipeline network historical data of a gas pipeline network, and a count of gas pipeline network grades and determine the inspection plan, the smart gas data center is configured to collect and store operation data of the Internet of Things system, the smart gas pipeline network device sensing network platform including a communication network and a gateway, the communication network and the gateway are configured to implement perceptual information sensing communication and control the information sensing communication, the smart gas pipeline network safety management platform performs data interaction with the smart gas pipeline network device sensing network platform and the smart gas service platform through the smart gas data center, the smart gas pipeline network device object platform including various types of gas pipeline network devices and monitoring devices, the monitoring devices include temperature and humidity sensors of gas metering devices; the smart gas user platform includes a plurality of smart gas user sub-platforms; the smart gas service platform includes a plurality of smart gas service sub-platforms; the smart gas pipeline network safety management platform includes a plurality of smart gas pipeline network safety management sub-platforms and a smart gas data center; the smart gas pipeline network device sensing network platform is configured to interact with the smart gas data center and the smart gas pipeline network device object platform; the smart gas pipeline network device object platform is configured to obtain a geographical feature, a pipeline feature, and pipeline network historical data of a gas pipeline network based on an obtaining instruction; the smart gas pipeline network safety management platform is configured to: obtain the geographical feature, the pipeline feature, and the pipeline network historical data of the gas pipeline network through the various types of gas pipeline network devices and the monitoring devices of the smart gas pipeline network device object platform, wherein the gas pipeline network is a pipeline distribution network formed by gas transmission pipelines and devices, the geographic feature refers to a feature of a geographic location where the gas pipeline network is located, the geographic feature includes a terrain environment and a location coordinate, the pipeline feature includes a material of the gas pipeline network, inner and outer diameters of the pipeline gas pipeline network, a count of gas pipeline branches, the pipeline network historical data includes a historical failure possibility and a historical impact range of the gas pipeline network; determine a gridding result through performing gridding processing on the gas pipeline network by a gridding algorithm based on a preset period based on the geographical feature, the pipeline feature, and the pipeline network historical data of the gas pipeline network, wherein the gridding result refers to each of a plurality of divided grid areas after the gridding processing and evaluation result corresponding to each of the plurality of divided grid areas, and the gridding processing refers to a process in which an inspection area of the gas pipeline network is divided by gridding based on a preset gridding standard and a plurality of divided inspection grid areas are evaluated based on a factor including safety of a gas pipeline and a surrounding environment to determine the evaluation result; determine a required inspection area and an optional inspection area based on the gridding result, wherein the required inspection area refers to an area with multiple failures have occurred in the past frequent failures in a short term, and the optional inspection area refers to an area that has already just been inspected in the short term and has no failures; generate a target inspection route based on the required inspection area and the optional inspection area, wherein to generate the target inspection route, the smart gas pipeline network safety management platform is further configured to: determine a grid safety failure possibility by processing an inspection time interval, an accident time interval, the geographical feature, and a gas density in a grid based on a possibility prediction layer, wherein the gas density in the grid is obtained by the monitoring devices of the smart gas pipeline network device object platform, the possibility prediction layer is a deep neural network, the possibility prediction layer is obtained by training through a gradient descent algorithm, a first training sample for training the possibility prediction layer is determined based on historical data, and a first label for training the possibility prediction layer is a subsequent actual failure possibility corresponding to the first training sample; determine a grid safety score by retrieving in a score preset table through a safety score evaluation layer based on the grid safety failure possibility, wherein the score preset table refers to a table storing grid safety failure possibilities of a plurality different sets of nodes or edges and grid safety scores corresponding to the grid safety failure possibilities, and the score preset table is preset according to historical data; and determine whether a grid area is the required inspection area or the optional inspection area by retrieving in an area preset table through a judgment layer based on the grid safety score and a gas pipeline network grade; determine an inspection plan based on the target inspection route, wherein the inspection plan includes an inspection time, an inspection route, the required inspection area, and the optional inspection area; generate the inspection instruction through a preset generation algorithm based on the inspection plan, upload the inspection instruction to the first server of the smart gas service platform through the communication network and the gateway of the smart gas pipeline network device sensing network platform, and send the inspection instruction to the terminal device used by an inspection person corresponding to the smart gas user platform, wherein the preset generation algorithm is a machine learning model capable of generating the inspection instruction through training; update a gas pipeline grid graph based on inspection data after inspecting each inspection area, wherein the inspection data is obtained from the terminal device of the smart gas user platform through the smart gas pipeline network device sensing network platform, wherein the inspection data includes environmental information and gas pipeline failure situation, the gas pipeline grid graph refers to a graph used to represent a connection relationship of the gas pipeline network, the gas pipeline grid graph includes at least one node and at least one edge, wherein the node represents each grid area, and the edge represents a connection between adjacent grid areas, wherein a node feature of the gas pipeline grid graph includes the geographical feature of the grid area, whether a gas pipeline has been inspected, and an edge feature of the gas pipeline grid graph includes an inter-grid correlation coefficient, wherein the inter-grid correlation coefficient refers to a parameter that measures a degree of influence between grid areas at both ends of the edge and the grid area; determine at least one failure possibility of the at least one node or the at least one edge through a failure possibility determination model based on an updated gas pipeline grid graph, wherein the failure possibility determination model is a graph neural network model, the failure possibility determination model is obtained based on the gradient descent algorithm, a second training sample of the failure possibility determination model includes a sample gas pipeline grid graph, and a second label is an actual failure possibility of each node/edge in the sample gas pipeline grid graph, the second training sample and the second label is determined based on the historical data; determine a grid safety score by retrieving in a score preset table based on the at least one failure possibility of the at least one node or the at least one edge through the safety score evaluation layer, and determine an updated inspection plan based on the grid safety score.

12. The Internet of Things system according to claim 11, wherein the smart gas pipeline network safety management platform is further configured to:
generate at least one candidate inspection route and at least one inspection movement time according to the geographic location of an area based on the required inspection area and the optional inspection area, wherein one of the at least one candidate inspection route corresponds to one of the at least one inspection movement time; and
determine the target inspection route based on the at least one candidate inspection route.

13. The Internet of Things system according to claim 12, wherein the smart gas pipeline network safety management platform is further configured to:
select a candidate inspection route with a shortest inspection movement time as the target inspection route based on the at least one candidate inspection route and the at least one inspection movement time.

14. The Internet of Things system according to claim 11, wherein the smart gas pipeline network safety management platform is further configured to:
determine the inspection time through a time preset table based on the target inspection route, an environmental factor, and a second failure possibility of the required inspection area, wherein
the environmental factor includes air humidity and air velocity, and the second failure possibility of the required inspection area includes a highest failure possibility and a lowest failure possibility.

15. The Internet of Things system according to claim 11, wherein parameters of the gridding algorithm include the grid safety failure possibility and a splitting condition, wherein the grid safety failure possibility and the splitting condition are used to judge whether to stop the gridding processing on the gas pipeline network.

16. The Internet of Things system according to claim 15, wherein the splitting condition includes a splitting threshold, the splitting threshold is related to gas safety processing efficiency, and the gas safety processing efficiency is related to a historical inspection time.

17. The Internet of Things system according to claim 11, wherein the smart gas pipeline network safety management platform is further configured to:
obtain a count of gas pipeline network grades from the smart gas user platform through the smart gas pipeline network device sensing network platform; and
determine the gas pipeline network grade through a grading preset table based on the geographical feature, the pipeline feature, the pipeline network historical data, and the count of the gas pipeline network grades.

18. The Internet of Things system according to claim 11, wherein the smart gas pipeline network safety management platform is further configured to:
periodically perform an adjustment on the inspection plan through a second preset algorithm based on the feedback data; wherein
the adjustment includes determining at least one required inspection area as the optional inspection area or determining at least one optional inspection area as the required inspection area.

19. A non-transitory computer-readable storage medium, wherein the storage medium stores computer instructions, and when a computer reads the computer instructions in the storage medium, the computer executes the method for safety inspection based on the smart gas geographic information system (GIS) according to claim 1.

* * * * *